United States Patent [19]

Herberg et al.

[11] Patent Number: 4,773,312
[45] Date of Patent: Sep. 27, 1988

[54] CLARIFYING VAT

[75] Inventors: Hans J. Herberg, Moosburg; Baldur Berger, Attenkirchen, both of Fed. Rep. of Germany

[73] Assignee: Anton Steinecker Maschinenfabrik GmbH, Freising, Fed. Rep. of Germany

[21] Appl. No.: 118,393

[22] Filed: Nov. 6, 1987

[30] Foreign Application Priority Data

Nov. 7, 1986 [DE] Fed. Rep. of Germany ... 8629841[U]

[51] Int. Cl.[4] .............................................. C12G 1/00
[52] U.S. Cl. ................................. 99/277.2; 99/278; 426/431; 426/518; 426/519
[58] Field of Search ................... 99/276, 277, 277.1, 99/277.2, 278; 426/29, 16, 30, 431, 518, 519; 435/315, 316

[56] References Cited

U.S. PATENT DOCUMENTS

| 3.380,373 | 4/1968 | Lenz | 99/278 |
| 3,583,875 | 6/1971 | Wiesenauer | 99/278 |
| 3,589,270 | 6/1971 | Schlimme | 99/277.2 |
| 4,327,631 | 5/1982 | Smith | 99/277.2 |
| 4,542,682 | 9/1985 | Hancock | 99/277.1 |

Primary Examiner—Robert W. Jenkins
Attorney, Agent, or Firm—Scully, Scott, Murphy & Presser

[57] ABSTRACT

A clarifying or clearing vat for the production of worts during the manufacture of beer, including a chopping or breaking open arrangement incorporating a carrying arm which is raisably and lowerably drivable about a central shaft in the clarifying vat. Knives are mounted on the arm for the breaking open or chopping of the brewer's grain. A grain sweeping beam is articulated to the carrying arm and is swingable from a lowered operative position into an elevated or raised inoperative position, whereby the grain sweeping beam is retained in the inoperative position thereof by a latching element which engages into a bolt provided on the carrying arm.

10 Claims, 4 Drawing Sheets

CLARIFYING VAT

BACKGROUND OF THE INVENTION

1. Field of the Invention

The present invention relates to a clarifying or clearing vat for the production of worts during the manufacture of beer, including a chopping or breaking open arrangement incorporating a carrying arm which is raisably and lowerably drivable about a central shaft in the clarifying vat, knives being mounted on the arm for the breaking open or chopping of the brewer's grain, and including a grain sweeping beam which is articulated to the carrying arm and which is swingable from a lowered operative position into an elevated or raised inoperative position, whereby the grain sweeping beam is retained in the inoperative position thereof by a latching element which engages into a bolt provided on the carrying arm.

2. Discussion of the Prior Art

Clarification vats of this type are known in this technology and are utilized for the production of worts during the manufacture of beer. Hereby, they serve the purpose of separating solids from the mash which is filled into the clarifying vat. The solids (brewer's grains, deposit themselves on the bottom of the clarifying vat. In the clarifying vat there is arranged a chopping or breaking open device for the grain, possessing a carrying arm which extends horizontally from a central shaft up to approximately the circumferential sidewalls of the clarifying vat. Knives are fastened to this carrying arm, which knives serve loosen the deposited grain cakes, so that as many regions as possible of the brewer's grain can be extracted for the recovery of wort.

After the completion of the clarification, the brewer's worts are mechanically discharged. It is known to employ grain sweeping beams for this purpose. The grain sweeping beams are upwardly and downwardly swivable relative to the carrying arm which carries the knives, such that in a lowered operative position thereof they can reach down to the bottom of the clarifying vat. Through rotation of the central shaft, these grain sweeping beams sweep across the bottom, and slide the brewer's grains in front thereof towards discharge openings which are provided in the bottom, through which the grains will then drop out of the clarifying vat.

The openings are hereby arranged in the outer region of the bottom, whereby the inwardly located brewer's grain must be moved outwardly during the rotational movement of the grain sweeping beams. In order to achieve the foregoing, pursuant to the present state-of-the-technology there are employed through-extending or continuous (from the central shaft up to the circumferential region of the clarifying vat) grain sweepers, which extend in a generally S-shape between the central shaft and the sidewall of the clarifying vat. Grain sweepers of this type are known under the tradename "Meyer-Ulm".

However, these known chopping devices with grain sweepers of the above-described type are disadvantageous in that, frequently, it is not possible to achieve a complete discharge or expulsion of the grains and, moreover, the production becomes quite complex due to the particular path of flow.

SUMMARY OF THE INVENTION

Accordingly, it is an object of the present invention to so modify and improve upon a clarifying vat of the above-mentioned type, as to enable a simple and complete sweeping out or expulsion of the brewer's grains.

The foregoing object is achieved with a clarifying vat of the above-mentioned type, in that fastened on grain weeping beams are individual grain sweepers which are angled relative to the longitudinal axis of the beam, and which are so employed that, during the rotational movement of the carrying arm, they will conduct the brewer's grains radially outwardly between themselves, and whereby a closed slider is formed at the radially outer end of the grain sweeping beam. By means of a clarifying vat which is equipped with these features, the grains are conducted through between the angularly employed or set sweeper plates during the rotation of the grain sweeper beam towards a radially further outwardly located path of movement, whereby the angled arrangement or setting of the individual grain sweepers causes all grains which are encountered in the operative region of these grain sweepers to be conducted further outwardly. Through the rotation of the grain sweeping beam over a number of rotations, the grains are thereby reliably moved radially from the center up to the sidewalls, until they are finally engaged by the closed slider which is arranged at the radially outer end of the grain sweeping beam, and are then pushed over a grain opening. The grains then fall through this grain opening and can then be conveyed further as desired.

The configuration of individual grain sweepers, which are arranged angled on the grain sweeping beam so as to form passageways therebetween, is possible to be implemented in an extremely simple manner. It is adequate to provide grain sweepers of the simplest shape which are always fastened at suitable angles to the grain sweeping beam; for example, through welding. Hereby, it has been ascertained as being advantageous when the angular setting of the grain sweepers relative to the longitudinal axis of the beam is located within an angular range of 20° to 50°. Within this angular range it is ensured that, on the one hand, the grain sweeper will not only slide the grains in front of each other, but on the other hand, will engage them to such an extent so as to cause the grains to be radially outwardly conveyed to a suitable extent. Indicated as being particularly advantageous has been a setting angle of 30°. This setting angle can be identical for all grain sweepers.

Pursuant to the further embodiment of the invention, it is contemplated that a guide sweeper be arranged on the side of the grain sweeping beam facing towards the central shaft, which guide sweeper begins at the base socket for the central shaft and can be set in such a manner that the surface thereof extends somewhat tangentially relative to the base socket.

At this guide sweeper which acts the furthest inwardly towards the center of the clarifying vat, the grains are reliably engaged, and are pushed into the first, radially innermost located passageways between two grain sweepers.

For this purpose, the guide sweeper extends in a transition at its end towards the beam into sweeper elements which are set such that the path of the guide sweeper and of the two sweeper elements approximately conforms to a spiral having its origin in the axis of the central shaft. Through this approximate spiral configuration of the path of the guide sweeper and the sweeper elements in this inwardly located region, the grains in this region in general subjected to the same radial force during the rotation of the grain sweeping beam. Pursuant to a further advantageous embodiment of the invention, it is contemplated that the operative regions of the adjacent grain sweepers should overlap. This measure will ensure that the successive grain sweepers will fully engage the grains which are moved in the preceding circulation towards the associated grain sweeping path, and convey them onto a radially further outwardly located path of movement.

A further embodiment of the invention contemplates that the grain sweeping beam is articulated to the carrying bar through a toggle joint or linkage lever system in such a manner that upon the raising of the carrying beam, the former is moved into its raised inoperative position relative to the carrying beam. By means of this feature it is not necessary to provide a separate lifting arrangement for the raising of the grain sweeping beam. To the contrary, the grain sweeping beam is forcibly raised by means of a suitably constructed linkage lever system when the carrying arm is raised.

For the purpose of effecting the retention of the grain sweeping beam, a latching pin or bolt is provided on a latching lever and the latching element comprises a latching panel, whereby the latching panel is fastened by a latching panel retainer on the grain sweeping beam. A release latch is pivotably fastened on the latching panel retainer, which disengages the bolt from the latching panel during the unlatching procedure. Through the intermediary of these features, during the lifting of the carrying arm, the grain sweeping beam is raised for so long above the linkage system, untill the latching panel comes into engagement with the bolt. Upon reaching of this inoperative position, the carrying arm can then be lowered such that operation is effected with only the chopping knives. The grain sweeper are hereby inoperative due to their raised position. When in contrast therewith, the carrying arm is moved from this raised position in which the grain sweeping beam latches, to a still higher location, then the bolt is moved over the release latch. During the subsequent lowering of the carrying arm, the bolt is then conducted about the latching panel with the aid of the release latch, so that the grain sweeping beam can again be swung into its operative position.

BRIEF DESCRIPTION OF THE DRAWINGS

Reference may now be had to the following detailed description of preferred exemplary embodiments of the invention, taken in conjunction with the accompanying drawings; in which.

DETAILED DESCRIPTION

Figure 1:
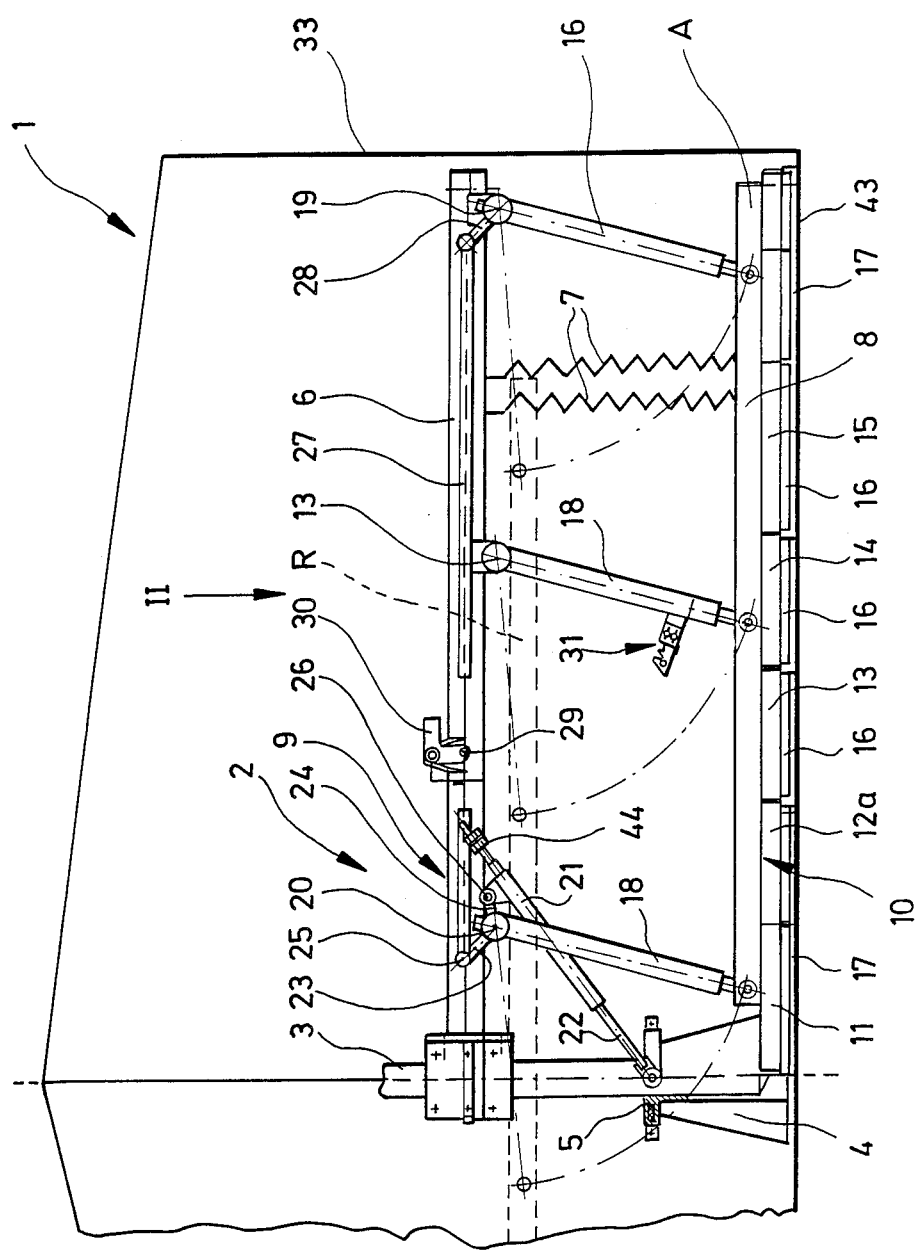
FIG. 1 illustrates a schematic partial representation of a clarifying vat with a chopping device, shown in a side elevational view.

In FIG. 1, the overall arrangement of the clarifying vat is designated with reference nmmeral 1, and has one-half thereof shown schematically. The clarifying vat possesses the shape of a circular cylinder, which is closed on the top and on the bottom. The connections for the infeed of the mash, for the discharge of the worts, and other usual infeed conduits are not illustrated in the drawing.

Arranged within the clarifying vat 1 is a chopping device, which is generally designed by the reference numeral 22. This chopping device is drivable about a central shaft 3 with the aid of a motor (not shown), so that it can rotate within the clarifying vat about the shaft 3. The shaft 3 is rotatably retained and supported in a socket base 4 through the intermediary of a shaft guide 5.

The chopping device 2 incorporates a carrying arm which extends horizontally up to the side wall 33, on which arm there are fastened chopping knives 7 over the entire length thereof, for purposes of clarity only two knives being shown in FIG. 1. These knives will, during the clarification or draining, chop up the grain materials which deposit themselves on the bottom 43 of the clarifying vat 1.

A grain sweeping beam 8 is fastened to the carrying arm 6 by means of a pivot bearing 19 and linkage arms 18, which sweeping beam rotates in unison with the carrying arm 6 within the clarifying vat 1 due to this fastening. The grain sweeping beam 8 can be swung from its upper inoperative position R illustrated by phantom-lines in FIG. 1 into the operative position A shown by the solid lines. In the operative position A, the grain sweepers 10 which are attached to the grain sweeping beam 8 sweep over the bottom 43 of the clarifying vat 1, and thereby conduct the deposited grain, in a manner as explained hereinbelow, radially outwardly in a direction towards the sidewall 33. Grain openings 32 are formed in this outer region in the bottom 43, through which the grains can then be pushed out.

Serving for the respective upward and downward swinging of the grain sweeping beam 8 with respect to the carrying arm 6 is a toggle joint or linkage lever system, which is generally designated with the reference numeral 9. This linkage lever system 9 incorporates two tie rods 22 (referring to FIG. 2) which are each hinged at one end to the socket base 4. These tie rods each support a sleeve 21 which is freely movable over the tie rods 22. The movement of the sleeve towards the non-articulated end of the tie rods 22 is limited by adjustable screws 44. A shorter lever 24 is hingedly connected with the sleeve 21, which lever engages at the pivot bearing of the radially innermost linkage arm 18. Fastened to this pivot bearing 20 is a further longer lever 23, which is connected through a pivot linkage 25 with the transmission rod 27. The transmission rod 27 is hingedly connected through a lever 28 with the pivot bearing 19 of the radially outer linkage arm 18. The middle linkage arm 18 is freely pivotable about its pivot bearing 19.

During the upward displacement of the carrying arm 6 with the aid of the central shaft 3 out of the position shown in solid lines in FIG. 1, the sleeve 21 comes initially into contact against the screws 44. Thereby, though the linkage 26 and the shorter linkage lever 24 there is produced a torque or turning moment about the pivot bearing 20, which is also transmitted though the longer lever 23 and the transmission rod 27 to the radially outer linkage arm 18. During the further raising of the carrying arm 6, the linkage arms 18 are, as a result, pivoted in a parallelogram-like manner relative to the carrying arm 6, whereby the grain sweeping beam 8 is moved into the upper inoperative position R. This inoperative position merely represents the relative position of the grain sweeping beam 8 with regard to the carrying arm 6 as shown in the drawing. When this position has been assumed, then the carrying arm 6 as well as the grain sweeping beam 8 are, in general, further upward than as is illustrated in FIG. 1.

In order to arrest the grain sweeping beam 8 in position, there is provided a latching element 31 which is fastened to the middle linkage arm 18, and which engages in a latching pin or bolt 29 formed on the carrying arm 6 as part of a latching lever 30.

The unlatching and latching procedure is described in further detail hereinbelow.

Figure 2:
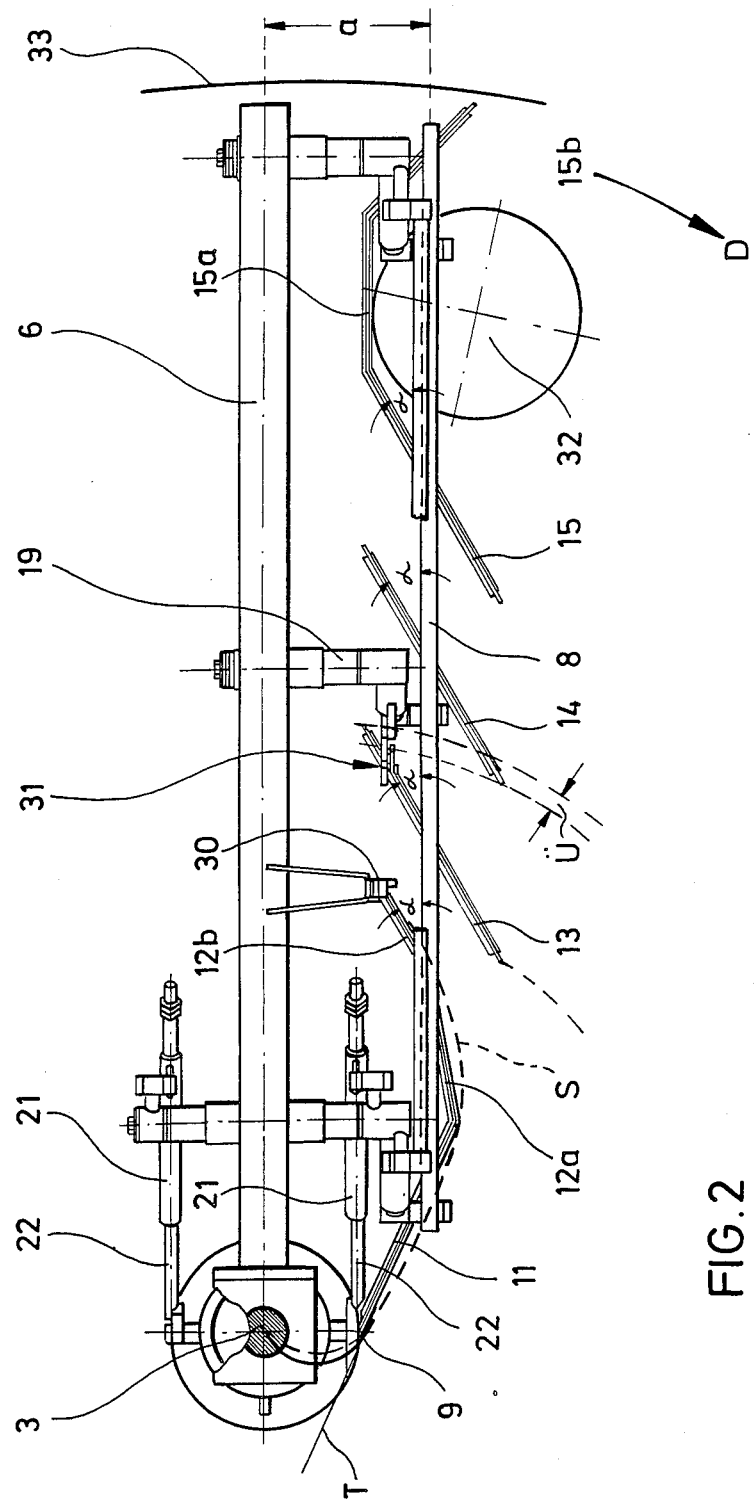
FIG. 2 illustrates a plan view in the direction of arrow A II in FIG. 1 facing towards the chopping device.

Thus, the grain sweeping beam 8 can be selectively brought into its raised inoperative position R or into its operative position A. This kind of lifting of the grain sweeping beam 8 by means of a parallel displacement relative to the carrying arm 6 renders it necessary to so arrange the grain sweeping beam that during upward swinging thereof, the end thereof towards the central shaft will swing past the central shaft 3. As illustrated in FIG. 2, the grain sweeping beam 8 is thereby fastened in advance over a suitable distance relative to the carrying arm 6 in the direction of rotation D.

Fastened on the grain sweeping beam 8 are the individual grain sweepers 11, 12a, 12b, 13, 14, and the closed slider 15, the latter of which similarly consists of individual grain sweeper segments. The innermost acting grain sweeper 11 is oriented such that its surface extends along a tangent T on the socket base 4. Hereby, this guide sweeper 11 is seated on the socket base at point P, and thereby will reliably strip off also the grains which deposit themselves along the wall of the base. This guide sweeper extends into two sweeper elements 12A and 12B, which are differently set relative to the longitudinal axis of the grain sweeping beam 8. The guide element 11 and the two sweeper elements 12A and 12B are hereby adjusted in such a manner that their extent generally approximates a spiral S, whose origin is found in the center of the shaft 3. In this manner, exerted on the grains in this region during the rotational movement are about the same radial forces across the width of the extent of these elements; meaning, ensured thereby is that at every location does there takes place a reliable outward conductance of the grains. The sweeper elements 12A and 12B form a first passageway in conjunction with a successive sweeper 13, through which the grains can be conducted. The grain sweeper 13, as well as the sweeper element 12B and the two successive sweepers 14 and 15 are set at an angle $\alpha$ relative to the grain sweeping beam 8. The angle $\alpha$ in the illustrated embodiment is 30°. The length and the spacing between the individual grain sweepers 13, 14, and 15 is so dimensioned that the paths which are presently traversed by the grain sweepers will to some extent overlap. This is illustrated in FIG. 2 for the grain sweepers 13 and 14. Hereby, the radial paths of movement of the facing ends of the grain sweepers 13 and 14 are presently illustrated, from which there can be recognized the region of overlap U. This ensures that the presently outwardly successive grain sweeper will fully engage the grains which are conducted outwardly by the inwardly located grain sweeper, and move the grains further outwardly.

The grain sweepers which are employable on the basis of this construction are of the simplest type, and can be simply be welded to the supporting sweeping beam 8. The grain sweepers can be constituted, for example, of copper or also of iron plate elements, whereby at the lower end of each grain sweeper there can be arranged a flat iron 16 as a holder for a wearplate 17. As a result the wearplates can be exchanged after being used and worn.

Figure 3:
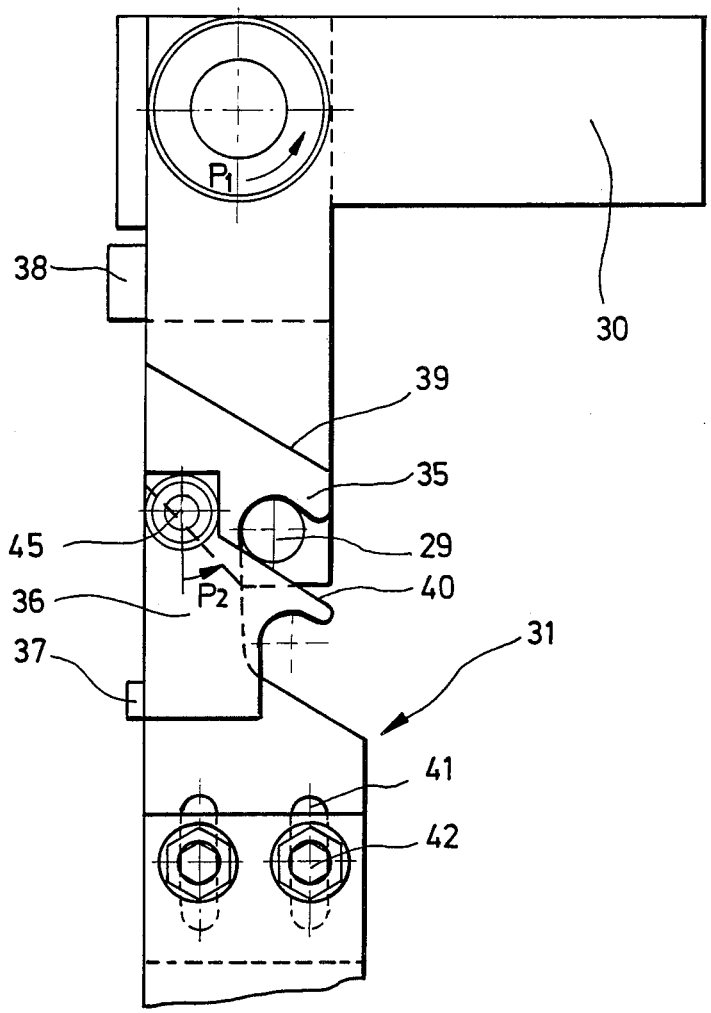
FIG. 3 illustrates the latching device for the retention of the grain sweeping beam on a carrying arm.

At the radial outer end, the grain sweeper 15 extends into further sweeper elements 15A and 15B, which form a closed slider, whose walls are set in such a manner that the inflowing grain materials are conducted over grain holes 32 which are provided along the outer circumferential region in the bottom 43. Through the illustrated angled setting of the grain sweepers, on one hand, the construction for the discharge of the grains becomes simple, and on the other hand, there is also ensured a reliable mode of operation. It has been evidenced that by means of such types of angled grain sweepers it is possible to achieve a complete and reliable discharge of the grain materials. When the discharge of the grains is finished, the grain sweeping beam 8 is swung into its inoperative position, as shown in FIG. 1, by means of the linkage system 9. Hereby, the grain sweeping beam 8 is restrained by a latching mechanism which is elucidated hereinbelow on the basis of FIG. 3. This latching mechanism incorporates a latching lever 30 which is fastened to the carrying arm 6, which lever is pivotable on a holder about a pivot axis 34. The stop 38 limits the pivotal movement of the latching lever 30 in a direction opposite to that of the direction of arrow $P_1$. The latching lever 30 can also pivot into the position shown in FIG. 3 in only the direction of the arrow $P_1$.

Fastened on the grain sweeping beam 8, more precisely to the middle linkage arm 18, is a latching element 31, which operates in conjunction with the bolt 29 of the latching lever 30. This latching element 31 possesses an upper latching pawl 35 with an upper sliding surface 39. Supported on the latching pawl 35 is a release latch 36 which is freely pivotable about the bearing 45. Also in this instance, is the pivoting path in opposition to the direction of arrow $P_2$ limited by a stop 37, so that the release latch 36 can pivot into the position shown in FIG. 3 only towards the right; meaning, in the direction of arrow $P_2$.

The latching pawl and the releasing latch are adjustably supported by means of slotted apertures 41 and applicable screws 42.

Figure 4D:
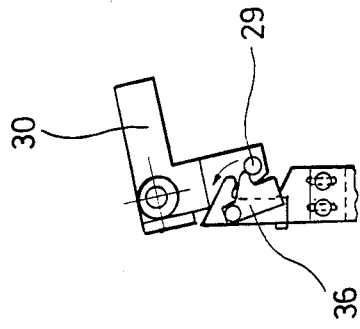
FIGS. 4a through 4d, respectively, illustrate the latch mechanism in different positions during the unlatching and latching sequences.
Figure 4C:
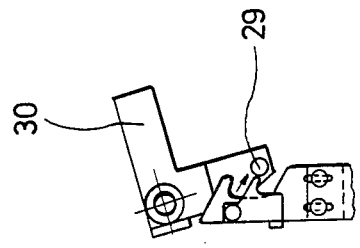
Figure 4B:
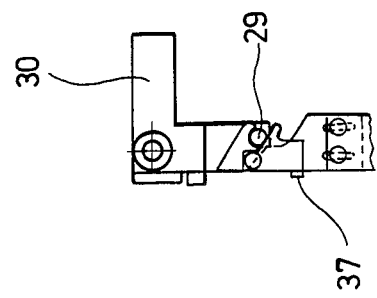
Figure 4A:
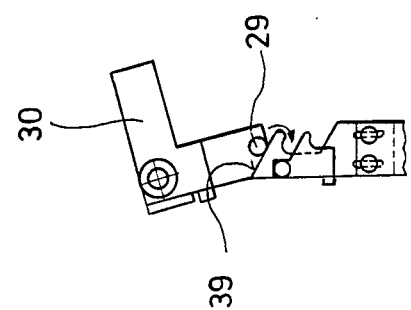

The manner of the operation of this latching mechanism can be recognized from FIGS. 4a through 4d. FIG. 4a elucidates the procedure during the latching in of the grain sweeping beam 8 during the upward movement of the carrying arm 6. As already mentioned, during the rising movement, the spacing between the carrying arm and the grain sweeping beam 8 reduces because of the action of the linkage lever system 9a, whereby a position is reached during the rising movement in which the sliding surface 39 of latching pawl 35 comes into contact with the bolt 29. The bolt 29 slides along the sliding surface 39 and, due to the inherent weight of the latching lever 30 is moved into the position, as shown in FIG. 4b, behind the latching element 35. The grain sweeping beam is thereby latchingly fastened to the carrying arm 6. When a chopping sequence is to be implemented, the carrying arm 6 can be again moved downwardly to such an extent, such that the chopping knives 8 will operate. During the operation of the chopping knives, the grain sweeping beam 8, remains in its upper inoperative position due to the latched condition. When sweeping out is to be commenced, then the carrying arm 6 is again raised, and namely into a position which is higher located than is required for the latching pursuant to FIG. 4b. Upon a further rising, the spacing between the grain sweeping beam 8 and the carrying arm reduces still more, so that the bolt 29 can then, in accordance with FIG. 4c, travel along the sliding surface 40 of the releasing latch 36. As a result thereof, the latching lever 30 is pivoted into the position shown in FIG. 4c, so that the bolt 29 travels about the releasing latch 40. The weight of the latching lever 30 itself then presses the bolt behind the projection on the releasing latch 40. When the carrying arm 6 has now descended, then the bolt 29 presses the releasing latch 36 into the pivoted position which is illustrated in FIG. 4d. In this position, the latching member 35 is bypassed such that the bolt 29 will be conducted about the latching member 35 during the descending movement. Thereby, the grain sweeping beam 8 is unlatched and can be lowered into the position shown in FIG. 1. In this position, the linkage arms 18 do not extend quite vertically. This signifies that the grain sweeping beam will, under its own weight, be seated on the bottom and there reliably, without being lifted, slide along the bottom surface for the sweeping out of the grains.

It is clearly apparent that the invention is not limited to the illustrated embodiment. Thus, operation can be effected with more angularly set grain sweepers than are illustrated in the drawing figures. Moreover, the chopping device can possess a more than the herein illustrated arms, for example, two aperature arms which are offset by 180° with respect to each other.

What is claimed is:

1. In a clarifying vat for the production of worts during the manufacture of beer, including a chopping arrangement having a carrying arm; a central shaft in said clarifying vat, said carrying arm being raisable and lowerable and drivable about said shaft; knives for the chopping of grain being arranged on said arm; a grain sweeping beam which is hingedly connected with the carrying arm and which is swingable from a lowered operative position into an elevated inoperative position; and a latching element engaging in a bolt on the carrying arm for maintaining said grain sweeping beam in the inoperative position; the improvement comprising in that individual grain sweepers are fastened on the grain sweeping beam which extend at angles relative to the longitudinal axis of said beam such that during rotational movement of the carrying arm the grain are conducted radially outwardly between said sweepers; and a closed slider being formed at the radially outer end of the grain sweeping beam.

2. A clarifying vat as claimed in claim 1, wherein the setting angles of the grain sweeper are within the range of about 20° to 50° relative to the longitudinal axis of the beam.

3. A clarifying vat as claimed in claim 2, in which the setting angle is 30°.

4. A clarifying vat as claimed in claim 1, wherein a guide sweeper is arranged on the side of the grain sweeping beam extending towards the central shaft, said guide sweeper beginning at a socket base for the central shaft and being set such that the surface thereof extends substantially tangentially to the socket base.

5. A clarifying vat as claimed in claim 4, wherein the end of the guide sweeper towards the beam extends into sweeper elements which are set the path from the guide sweeper and two sweeper elements approximates a spiral having its origin in the axis of the central shaft.

6. A clarifying vat as claimed in claim 1, wherein the operative regions of adjacent grain sweepers overlap.

7. A clarifying vat as claimed in claim 1, wherein the lower sides of said grain sweepers are each equipped with a flat iron plate and a wearplate.

8. A clarifying vat as claimed in claim 1, wherein the grain sweeping beam includes a linkage lever system for hinged connection with the carrying arm such that upon the elevation of the carrying arm, said beam is displaced in parallel with said arm into the raised inoperative position thereof.

9. A clarifying vat as claimed in claim 1, wherein said bolt for the retention of the grain sweeping beam is formed on a latching lever, and said latching element comprises a latching pawl having a latch holder for connection with the grain sweeping beam.

10. A clarifying vat as claimed in claim 9, wherein a releasing latch is pivotally fastened on the latch holder, said release latch releasing said bolt from the latching pawl during an unlatching procedure.

* * * * *